United States Patent [19]

Mikura

[11] 4,254,864
[45] Mar. 10, 1981

[54] PROTECTIVE JACKET FOR PLANE MAGNETIC RECORDING MEDIUM

[75] Inventor: Chiho Mikura, Tokyo, Japan

[73] Assignee: TDK Electronics Company Limited, Tokyo, Japan

[21] Appl. No.: 20,061

[22] Filed: Mar. 13, 1979

[30] Foreign Application Priority Data

Apr. 3, 1978 [JP] Japan ................................ 53-43610

[51] Int. Cl.³ ...................... B65D 85/30; B65D 85/57
[52] U.S. Cl. ..................................... 206/313; 206/444
[58] Field of Search ............... 206/444, 312, 313, 484

[56] References Cited

U.S. PATENT DOCUMENTS

| | | | |
|---|---|---|---|
| 2,653,120 | 9/1953 | Adler | 106/484 |
| 3,370,365 | 2/1968 | Vosbikian | 206/484 |
| 3,864,755 | 2/1975 | Hargis | 206/313 |

FOREIGN PATENT DOCUMENTS 1041818  9/1966  United Kingdom ..................... 206/313

Primary Examiner—Joseph Man-Fu Moy
Attorney, Agent, or Firm—Oblon, Fisher, Spivak, McClelland & Maier

[57] ABSTRACT

A protective jacket for rotatably holding a plane disc magnetic recording medium between buffer sheets bonded on the inner surfaces of a body of the protective jacket in vortex or annular form around a rotary axis of the plane disc magnetic recording medium.

3 Claims, 5 Drawing Figures

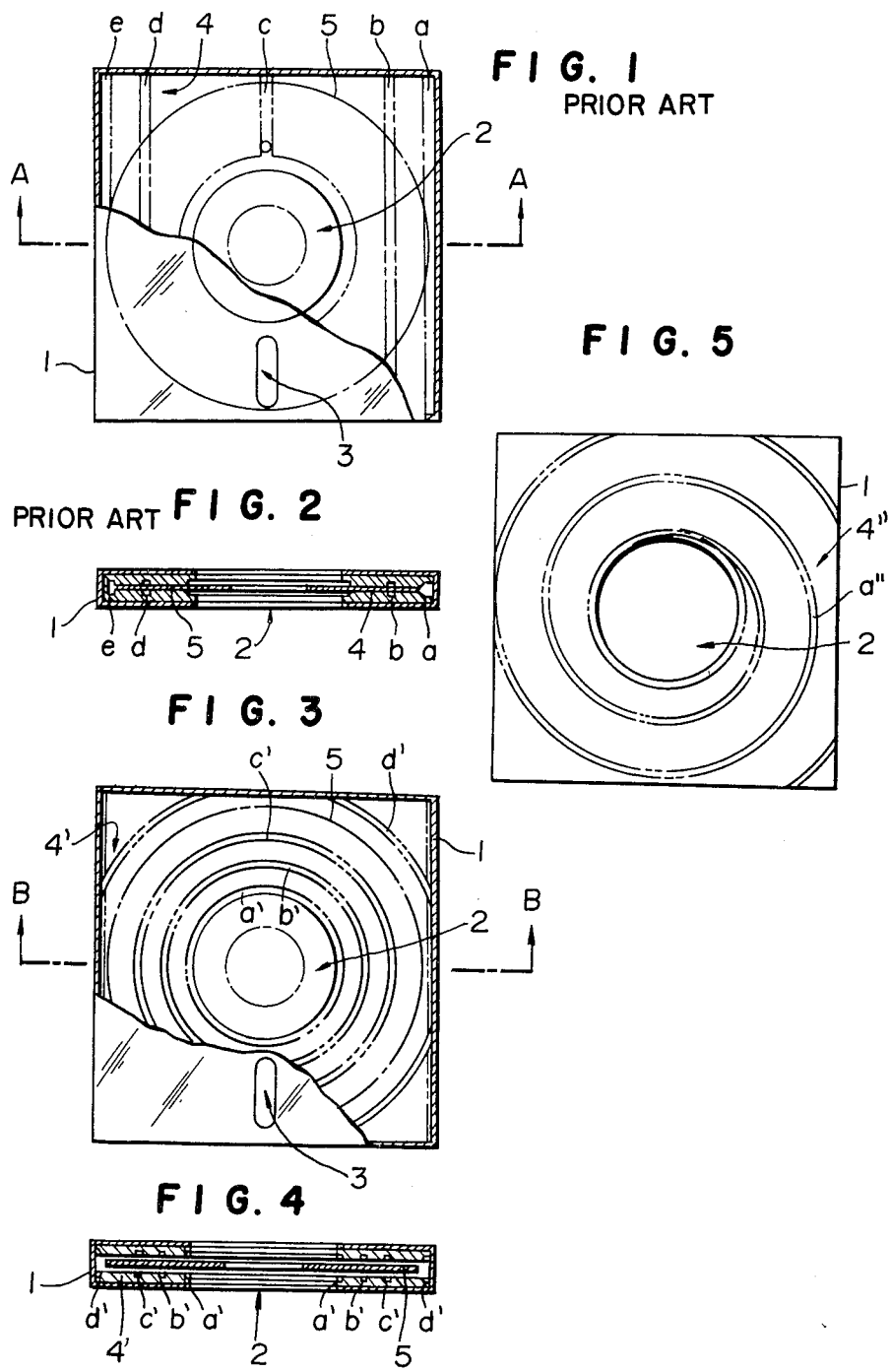

PROTECTIVE JACKET FOR PLANE MAGNETIC RECORDING MEDIUM

BACKGROUND OF THE INVENTION

1. Field of the Invention

The present invention relates to a protective jacket for holding a plane disc magnetic recording medium.

2. Description of the Prior Art

Plane magnetic recording media have been widely used as recording media in data processing apparatus, and have been prepared by coating a magnetic varnish on a substrate made of polyester etc. to form a magnetic layer as in the conventional magnetic tape.

The plane magnetic recording medium has been held in a protective jacket so as to protect the recording surface thereof and to reinforce the flexible substrate and it is rotated in the protective jacket to write in or to read out data.

FIGS. 1 and 2 show the conventional protective jackets. FIG. 1 is a sectional plane view and FIG. 2 is a sectional view taken along A—A line of FIG. 1.

As shown in FIGS. 1 and 2, the conventional protective jacket comprises a central opening (2) and a head inserting opening (3) on the central part of a jacket body which is formed by sealing all of peripheral sides; and buffer sheets (4) such as nonwoven sheets which are bonded on both inner surfaces of the jacket body (1) in linear forms; and a disc magnetic recording medium (5) which is held between the buffer sheets (4) in linear forms.

In the conventional protective jacket, the buffer sheets (4) are heat-bonded in the linear forms on the inner walls at bonding parts a, b, c, d and e except the central opening (2) and the head inserting opening (3).

In this structure, the surfaces a, b, c, d and e of the buffer sheets (4) are lower than the non-bonding parts to form gaps between the surfaces of the buffer sheets (4) and the non-bonded inner wall.

Therefore, frictions of the buffer sheets are large and sometimes hooking trouble is caused when the disc magnetic recording medium (5) is rotated in the jacket body (1), whereby the recording surface of the magnetic recording medium (5) is damaged to deteriorate reproducing output characteristics and modulation percentage. Sometimes, it is sufficiently to be useless.

SUMMARY OF THE INVENTION

It is an object of the present invention to overcome the disadvantages of the conventional protective jacket and to provide a protective jacket having high reliability which does not cause any damage on a magnetic recording medium.

The foregoing and other objects of the present invention have been attained by providing a protective jacket for rotatably holding a plane disc magnetic recording medium between buffer sheets bonded on inner surfaces of the jacket in vortex or annular form around a rotary axis of the plane disc magnetic recording medium.

BRIEF DESCRIPTION OF THE DRAWINGS

FIG. 1 is a sectional plane view of the conventional protective jacket for a plane magnetic recording medium;

FIG. 2 is a sectional view taken along A—A line of FIG. 1;

FIG. 3 is a sectional plane view of one embodiment of the protective jacket for a plane magnetic recording medium of the present invention;

FIG. 4 is a sectional view taken along B—B line of FIG. 3;

FIG. 5 is a sectional plane view of the other embodiment of the protective jacket for a plane magnetic recording medium of the present invention.

DETAILED DESCRIPTION OF THE PREFERRED EMBODIMENTS

Referring to the drawings, the present invention will be illustrated. FIG. 3 is a sectional plane view of one embodiment of the protective jacket of the present inventio and FIG. 4 is a sectional view taken along B—B line of FIG. 3.

In FIGS. 3 and 4, the identical or corresponding parts are designated by the same reference numbers to those of FIGS. 1 and 2.

The central opening (2) and the head inserting opening (3) are formed on the central part of the body (1) of the protective jacket. In the embodiment, the buffer sheets (4') are bonded on the inner surfaces of the jacket in an annular form around the central opening (2) of the plane disc magnetic recording medium.

In this structure, when the magnetic recording medium (5) is rotated in the body (1) of the protective jacket, the rotating direction corresponds to the annular positions a', b', c' and d' of the buffer sheets 4' bonded on the inner walls whereby friction is small and hooking trouble is not caused, and the damage of the recording surfaces of the magnetic recording medium 5 is prevented and the reliability can be remarkably improved.

FIG. 5 shows the other embodiment of the protective jacket of the present invention. In this embodiment, the buffer sheets (4") are bonded on the inner walls of the body (1) of the protective jacket in the vortex form a".

In such structure, the direction of the buffer sheet (4") in the vortex form a" continues to be the rotating direction of the magnetic recording medium (5) whereby friction can be further reduced and the damage of the recording surface of the magnetic recording medium (5) can be further prevented.

The buffer sheets (4'), (4") can be bonded by a heat-press bonding method as that of the conventional method.

In accordance with the present invention, the buffer sheet is bonded on the inner surfaces of the body of the protective jacket in vortex or annular form around a rotary axis of the plane disc magnetic recording medium whereby friction of the buffer sheets to the magnetic recording medium can be reduced and the hooking trouble can be prevented, the damage of the recording surface can be prevented to remarkably improve reliability.

What is claimed is:

1. A protective jacket for rotatably holding therein for rotation about an axis, a plane disc recording medium, said jacket including at least one buffer sheet bonded on the inner surfaces of said jacket, said at least one sheet contacting both planar surfaces of said disc, wherein said at least one buffer sheet is bonded to said jacket by a bond in the form of a plurality of gaps formed in said at least one buffer sheet forming concentric circles about said axis.

2. A protective jacket for rotatably holding therein for rotation about an axis, a plane disc recording medium, said jacket including at least one buffer sheet bonded on the inner surfaces of said jacket, said at least one sheet contacting both planar surfaces of said disc, wherein said at least one buffer sheet is bonded to said jacket by a bond in the form of a gap formed in said at least one buffer sheet forming a vortex about said axis.

3. The protective jacket of claim 1 or 2 wherein said at least one buffer sheet comprises two buffer sheet portions, each of said two buffer sheet portions contacting one planar surface of said disc.

* * * * *